United States Patent
Horikawa et al.

(10) Patent No.: US 8,962,744 B2
(45) Date of Patent: *Feb. 24, 2015

(54) COPOLYMER, RUBBER COMPOSITION, CROSSLINKED RUBBER COMPOSITION AND TIRE

(75) Inventors: Yasuo Horikawa, Kodaira (JP); Shojiro Kaita, Nerima-ku (JP); Olivier Tardif, Narimasu (JP); Junko Matsushita, Tachikawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/983,141

(22) PCT Filed: Feb. 2, 2012

(86) PCT No.: PCT/JP2012/000723
§ 371 (c)(1),
(2), (4) Date: Sep. 16, 2013

(87) PCT Pub. No.: WO2012/105272
PCT Pub. Date: Aug. 9, 2012

(65) Prior Publication Data
US 2014/0018493 A1    Jan. 16, 2014

(30) Foreign Application Priority Data

Feb. 4, 2011 (JP) ................ 2011-023405

(51) Int. Cl.
| | | |
|---|---|---|
| *C08L 9/00* | (2006.01) | |
| *C08F 236/06* | (2006.01) | |
| *B60C 1/00* | (2006.01) | |
| *C08F 236/04* | (2006.01) | |
| *C08L 15/00* | (2006.01) | |

(52) U.S. Cl.
CPC .............. *C08F 236/06* (2013.01); *B60C 1/00* (2013.01); *C08F 236/04* (2013.01); *C08L 15/00* (2013.01); *C08L 9/00* (2013.01); *B60C 1/0016* (2013.01)
USPC .......................................... 524/571; 524/574

(58) Field of Classification Search
USPC ....................................................... 524/571
See application file for complete search history.

(56) References Cited

U.S. PATENT DOCUMENTS

| 6,288,191 | B1 * | 9/2001 | Nishiyama et al. | 526/339 |
|---|---|---|---|---|
| 7,094,854 | B2 * | 8/2006 | Monteil et al. | 526/339 |
| 2003/0004287 | A1 * | 1/2003 | Barbotin et al. | 526/127 |
| 2011/0136995 | A1 * | 6/2011 | Nakagawa et al. | 526/126 |

FOREIGN PATENT DOCUMENTS

| CN | 1310188 A | 8/2001 | |
|---|---|---|---|
| CN | 101045770 A | 10/2007 | |
| JP | 09-291121 A | 11/1997 | |
| JP | 09291121 A * | 11/1997 | ............ C08F 210/08 |
| JP | 11-228743 A | 8/1999 | |
| JP | 11-315119 A | 11/1999 | |
| JP | 2000-095903 A | 4/2000 | |
| JP | 2000-154210 A | 6/2000 | |
| JP | 2001-294607 A | 10/2001 | |
| JP | 2006-503141 A | 1/2006 | |
| JP | 2006-249442 A | 9/2006 | |
| JP | 2008-280384 A | 11/2008 | |
| JP | 2008280384 A * | 11/2008 | |
| JP | 2012-031314 A | 2/2012 | |
| WO | 2009/148140 A1 | 12/2009 | |
| WO | 2012/014456 A1 | 2/2012 | |
| WO | 2012031314 A1 | 3/2012 | |

OTHER PUBLICATIONS

Translation of JP 2008-280384, Nov. 2008.*
Translatin of JP 09-291121, Nov. 1997.*
Office Action issued on Aug. 18, 2014 from the State Intellectual Property Office of P. R. China in a Chinese Application No. 201280014415.3.
Communication dated Oct. 14, 2014 from The Japanese Patent Office in counterpart Japanese Patent Application No. 2011023405.

* cited by examiner

*Primary Examiner* — Hui Chin
(74) *Attorney, Agent, or Firm* — Sughrue Mion, PLLC

(57) ABSTRACT

The present invention provides a random copolymer that is used for manufacturing a tire having excellent rollability and wear resistance and that includes randomly arranged monomer units of a conjugated diene compound and of a non-conjugated olefin, a rubber composition containing the random copolymer, a cross-linked rubber composition obtained by crosslinking the rubber composition, and a tire manufactured by using the rubber composition or the cross-linked rubber composition. A copolymer of a conjugated diene compound and a non-conjugated olefin, including a random copolymer having randomly arranged monomer units of the conjugated diene compound and of the non-conjugated olefin, and containing, by more than 30 mol %, a unit derived from the conjugated diene compound.

13 Claims, 2 Drawing Sheets

COPOLYMER, RUBBER COMPOSITION, CROSSLINKED RUBBER COMPOSITION AND TIRE

CROSS REFERENCE TO RELATED APPLICATIONS

This application is a National Stage of International Application No. PCT/JP2012/000723 filed Feb. 2, 2012, claiming priority based on Japanese Patent Application No. 2011-023405 filed Feb. 4, 2011, the contents of all of which are incorporated herein by reference in their entirety.

TECHNICAL FIELD

The present invention relates to a copolymer, a rubber composition, a crosslinked rubber composition and a tire, and in particular, to a random copolymer that is used for manufacturing a rubber having excellent rollability and wear resistance and that includes randomly arranged monomer units of a conjugated diene compound and of a non-conjugated olefin, a rubber composition containing the random copolymer, a crosslinked rubber composition obtained by crosslinking the rubber composition, and a tire manufactured by using the rubber composition or the crosslinked rubber composition.

BACKGROUND ART

At least two different monomers can be polymerized in the same polymerization system so as to generate a copolymer having those different monomer units arranged as repeating units in one polymer chain, and the copolymer thus obtained can be classified into a random copolymer, an alternate copolymer, a block copolymer, or a graft copolymer, depending on the arrangement of the monomer units. However, no report has been made on the arrangement of monomer units in polymerization reaction of a conjugated diene compound and a non-conjugated olefin.

For example, JP 2000-154210 A (PTL 1) discloses such a catalyst for polymerizing a conjugated diene that contains a transition metal compound of group IV of the periodic table having a cyclopentadiene ring structure, and also discloses α-olefins such as ethylene as monomers which can be copolymerized with the conjugated diene. PTL 1, however, does not at all refer to the arrangement of the monomer units in a copolymer. Further, JP 2006-249442 A (PTL 2) discloses a copolymer of an α-olefin and a conjugated diene compound, but no reference is made on the arrangement of monomer units in the copolymer. Further, JP 2006-503141 A (PTL 3) discloses an ethylene-butadiene copolymer synthesized by using a catalytic system consisting of a specific organometallic complex, but merely describes that the butadiene as a monomer is inserted in the form of trans-1,2-cyclohexane into the copolymer, without making any reference to the arrangement of monomer units in the copolymer.
In addition, there is no description or suggestion in PTL 1 to 3 that a rubber having excellent rollability and wear resistance can be manufactured by using a random copolymer which contains, by more than 30 mol %, a unit derived from a conjugated diene compound in the copolymer.

Further, JP 11-228743 A (PTL 4) discloses an unsaturated elastomer composition composed of an unsaturated olefin-based copolymer and a rubber, but merely describes that monomer units in the copolymer are randomly arranged. PTL 4 fails to provide a rubber that has excellent rollability and wear resistance (index).

There is no description or suggestion that a rubber having excellent rollability and wear resistance can be manufactured by using a copolymer which contains, by more than 30 mol %, a unit derived from a conjugated diene compound in the copolymer.

CITATION LIST

Patent Literature

PTL 1: JP 2000-154210 A
PTL 2: JP 2006-249442 A
PTL 3: JP 2006-503141 A
PTL 4: JP 11-228743 A

SUMMARY OF INVENTION

Technical Problem

In view of the above, an object of the present invention is to provide a random copolymer that is used for manufacturing a rubber having excellent rollability and wear resistance and that includes randomly arranged monomer units of a conjugated diene compound and of a non-conjugated olefin, a rubber composition containing the random copolymer, a crosslinked rubber composition obtained by crosslinking the rubber composition, and a tire manufactured by using the rubber composition or the crosslinked rubber composition.

Solution To Problem

The inventors of the present invention have made intensive studies to achieve the above-described object and found that reaction in the presence of a specific catalyst may yield a random copolymer which contains, by more than 30 mol %, a unit derived from a conjugated diene compound. The present invention has been completed based on this finding.

That is, a copolymer of a conjugated diene compound and a non-conjugated olefin according to the present invention is a random copolymer having randomly arranged monomer units of the conjugated diene compound and of the non-conjugated olefin, and containing, by more than 30 mol %, a unit derived from the conjugated diene compound.

A preferred example of the copolymer according to the present invention contains, by at least 5 mol %, alternate bonding units of the conjugated diene compound and the non-conjugated olefin in a unit derived from the non-conjugated olefin.

In another preferred example of the copolymer according to the present invention, the content of the unit derived from the conjugated diene compound is 50 mol % or more and less than 100 mol %.

In an still another preferred example of the copolymer according to the present invention, the content of 1,2 adduct units (including 3,4 adduct units) of the conjugated diene compound in the unit derived from the conjugated diene compound is preferably 5% or less.

The copolymer according to the present invention preferably has a polystyrene-equivalent average-weight molecular weight of 10,000 to 10,000,000.

The copolymer of the present invention preferably has a molecular weight distribution (Mw/Mn) of 10 or less.

In a preferred example of the copolymer according to the present invention, the non-conjugated olefin is an acyclic olefin.

In another preferred example of the copolymer of the present invention, the non-conjugated olefin has 2 to 10 carbon atoms.

In the copolymer according to the present invention, the non-conjugated olefin is preferably at least one selected from the group consisting of ethylene, propylene, and 1-butene, and is more preferably ethylene.

In another preferred example of the copolymer according to the present invention, the conjugated diene compound is at least one selected from the group consisting of 1,3-butadiene and isoprene.

A rubber composition according to the present invention includes the copolymer of the present invention.

The rubber composition according to the present invention preferably includes, with respect to 100 parts by mass of the rubber component, a reinforcing filler by 5 parts by mass to 200 parts by mass, and a crosslinking agent by 0.1 parts by mass to 20 parts by mass.

A crosslinked rubber composition according to the present invention is obtained by crosslinking the rubber composition of the present invention.

A tire according to the present invention is manufactured by using the rubber composition of the present invention or the crosslinked rubber composition of the present invention.

Advantageous Effect of Invention

The present invention may provide a random copolymer that is used for manufacturing a rubber having excellent rollability and wear resistance and that includes randomly arranged monomer units of a conjugated diene compound and of a non-conjugated olefin, a rubber composition containing the random copolymer, a crosslinked rubber composition obtained by crosslinking the rubber composition, and a tire manufactured by using the rubber composition or the crosslinked rubber composition.

DESCRIPTION OF EMBODIMENTS

Copolymer

Figure 1:
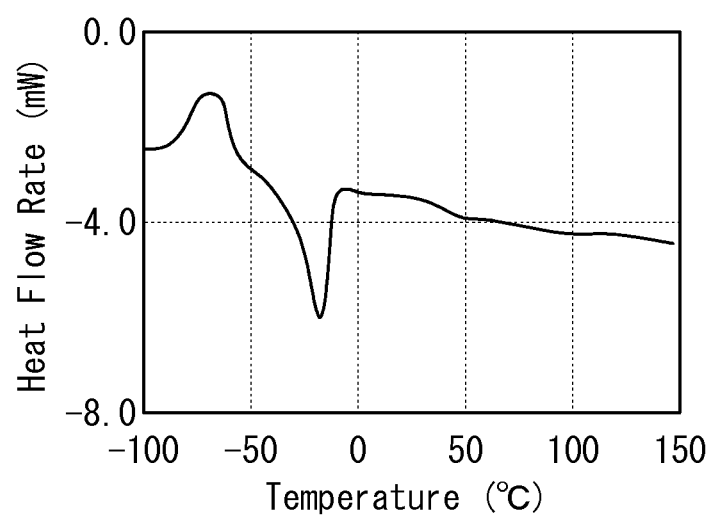
FIG. 1 illustrates a DSC curve of Copolymer A.
Figure 2:
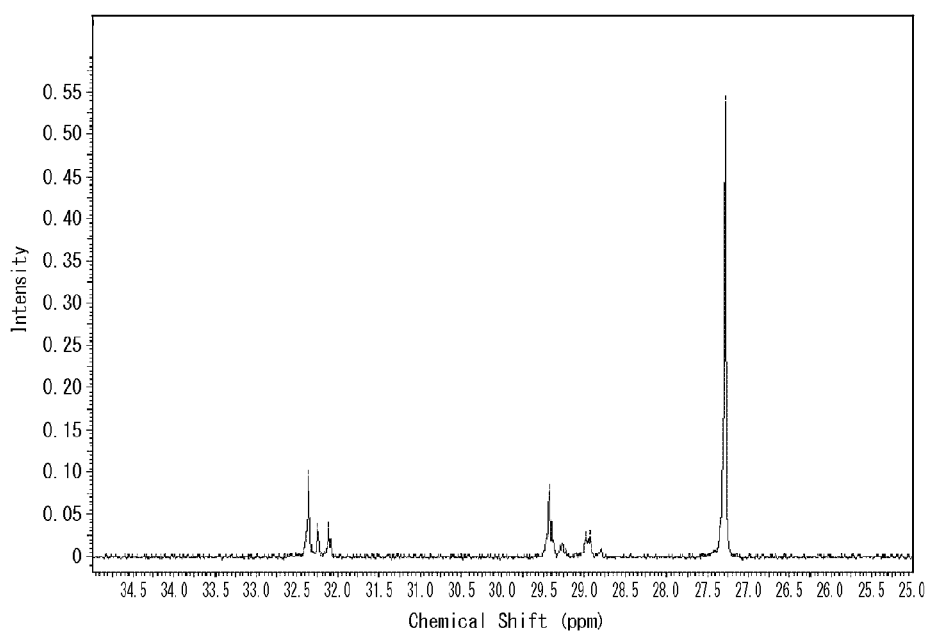
FIG. 2 illustrates a $^{13}$C-NMR spectrum of Copolymer A.

The present invention will be described in detail below. A copolymer of a conjugated diene compound and a non-conjugated olefin according to the present invention is a random copolymer having randomly arranged monomer units of the conjugated diene compound and of the non-conjugated olefin, and containing, by more than 30 mol %, a unit derived from the conjugated diene compound.

As used herein, the term "random copolymer" indicates a copolymer randomly arranged in statistical terms; for example, such copolymers in which alternate bonding units, as described later, are contained in an amount approximately equal to 100 mol % in a unit derived from the non-conjugated olefin, or in which block copolymer units are contained in an amount approximately equal to 100 mol % in a unit derived from the non-conjugated olefin, are not considered as random copolymers.

In the following examples, Polymers A, B and C are considered as random copolymers.

No restriction is particularly placed on the content of the unit derived from the conjugated diene compound as long as being more than 30 mol %. The content thereof may be selected appropriately depending on the intended use, and is preferably 50 mol % to 97 mol %, and more preferably 80 mol % to 97 mol %.

The content of the unit derived from the conjugated diene compound by 50 mol % to 97 mol % is advantageous in terms of blendability with diene rubber, fracture strength and elongation.

Regarding the copolymer of the present invention, a determination is made based on measurements using $^{13}$C-NMR as to whether the content of the unit derived from the conjugated diene compound is 30 mol % or more, while a determination is made using differential scanning calorimetry (DSC) as major measurement means as to whether the copolymer is considered as a random copolymer.

The differential scanning calorimetry (DSC) is a measuring method according to JIS K 7121-1987.

First of all, since no crystallization temperature derived from a block sequence including monomer units of a non-conjugated olefin is observed in DSC, the copolymer can be identified as a random copolymer.

The content of alternate bonding units of the conjugated diene compound and the non-conjugated olefin in the unit derived from the non-conjugated olefin is preferably 5 mol % or more, and more preferably 90 mol % or less.

As used herein, the phrase "contains, by at least 5 mol %, alternate bonding units of a conjugated diene compound and a non-conjugated olefin in a unit derived from the non-conjugated olefin" means that the non-conjugated olefin is present as alternate bonding units by 5 mol % or more in the unit derived from the non-conjugated olefin. This means that the proportion of A units in the binding units of conjugated diene compound B and non-conjugated olefin A in the form of BAB to the entire non-conjugated olefin A (100 mol %) contained in the copolymer is 5 mol % or more.

Hydrogenation of butadiene (conjugated diene compound) units BBB yields BAAB, where every A unit is no longer sandwiched between B units. An olefin-diene having any A unit sandwiched between B units cannot be synthesized by hydrogenation.

If the content of alternate bonding units of the conjugated diene compound and the non-conjugated olefin in the unit derived from the non-conjugated olefin is less than 5 mol %, fracture resistance may be reduced and low loss properties (low heat generation properties) may deteriorate. In contrast, if the content of alternate bonding units of the conjugated diene compound and the non-conjugated olefin in the unit derived from the non-conjugated olefin is in the above-described more preferred range, this is advantageous in terms of fracture strength, elongation and rollability.

It should be noted that the alternate bonding chains of the conjugated diene and the non-conjugated olefin may be distributed either continuously or discontinuously.

Regarding the copolymer of the present invention, a determination is made based on measurements using $^{13}$C-NMR as to whether the content of alternate bonding units of the conjugated diene compound and the non-conjugated olefin in the unit derived from the non-conjugated olefin is 5 mol % or more, while a determination is made using differential scanning calorimetry (DSC) as major measurement means as to whether the copolymer is considered as a random copolymer. The differential scanning calorimetry (DSC) is a measuring method according to JIS K 7121-1987.

Specifically, an integral ratio obtained in the $^1$H-NMR spectrum of a peak area for the entire unit derived from the non-conjugated olefin to a carbon peak area corresponding to the amount of alternate bonding units of the non-conjugated olefin may be used to ascertain that the copolymer of the present invention contains, by at least 5 mol %, alternate bonding units of the conjugated diene compound and the non-conjugated olefin in the unit derived from the non-conjugated olefin.

In the copolymer of the present invention, the content of the non-conjugated olefin unit is preferably over 0 mol % and not more than 50 mol %, and more preferably over 3 mol % and not more than 20 mol %. The content of the non-conjugated olefin unit falling within the ranges specified above is capable of effectively improving fracture resistance and elongation, without causing phase separation of the copolymer.

The copolymer of the present invention is free of a problem of molecular weight reduction, and the weight-average molecular weight (Mw) thereof is not particularly limited. However, in view of the application to polymer materials, a polystyrene-equivalent weight-average molecular weight (Mw) of the copolymer is preferably 10,000 to 10,000,000, preferably 10,000 to 1,000,000, and more preferably 50,000 to 600,000. Further, this copolymer preferably has a molecular weight distribution (Mw/Mn) of 10 or less, more preferably 5 or less, which is represented by a ratio of weight average molecular weight (Mw) to number average molecular weight (Mn). It should be noted here that the average molecular weight and the molecular weight distribution may be determined by gel permeation chromatography (GPC) using polystyrene as the standard.

The conjugated diene compound to be used as a monomer preferably has 4 to 12 carbon atoms. Specific examples of the conjugated diene compound include: 1,3-butadiene; isoprene; 1,3-pentadiene; and 2,3-dimethyl butadiene, with 1,3-butadiene and isoprene being preferred. In addition, these conjugated diene compounds may be used alone or in a combination of two or more.

Any of the aforementioned specific examples of the conjugated diene compound can be used for preparing the copolymer of the present invention in the same mechanism.

On the other hand, a non-conjugated olefin to be used as a monomer, which is a non-conjugated olefin other than the conjugated diene compound, has an excellent heat resistance, and is capable of reducing the ratio of double covalent bonds in the main chain of the copolymer so as to reduce crystallinity thereof, to thereby increase design freedom as an elastomer. Further, the non-conjugated olefin is preferably an acyclic olefin, and the non-conjugated olefin preferably has 2 to 10 carbon atoms. Therefore, preferred examples of the aforementioned non-conjugated olefin include α-olefins such as: ethylene; propylene; 1-butene; 1-pentene; 1-hexene; 1-heptene; and 1-octene. Among these, ethylene, propylene, 1-butene are more preferred, and ethylene is particularly preferred. These non-conjugated olefins may be used alone or in combination of two or more. As used herein, olefin refers to unsaturated aliphatic hydrocarbon, which is a compound containing at least one carbon-carbon double covalent bond.

In the copolymer of the present invention, the content (vinyl bond content) of 1,2 adduct units (including 3,4 adduct units) of the conjugated diene compound in the unit derived from the conjugated diene compound is preferably 5% or less, and more preferably 3% or less.

If the content of 1,2 adduct units (including 3,4 adduct units) of the conjugated diene compound in the unit derived from the conjugated diene compound is 5% or less, the copolymer of the present invention may achieve a further improvement in wear resistance.

The content of 1,2 adduct units (including 3,4 adduct units) and the cis-1,4 bond content each correspond to an amount contained in the unit derived from the conjugated diene compound, rather than the ratio to the entire copolymer. The content of 1,2 adduct units (including 3,4 adduct units) in the conjugated diene compound unit (the content of 1,2 adduct units (including 3,4 adduct units) of the conjugated diene compound in the unit derived from the conjugated diene compound) is equal to a 1,2-vinyl bond content when the conjugated diene compound is butadiene.

Next, a method of manufacturing the copolymer according to the present invention will be described in detail. However, the manufacturing method described in detail below is merely an example. A first method of manufacturing a copolymer of a conjugated diene compound and a non-conjugated olefin according to the present invention includes polymerizing a conjugated diene compound and a non-conjugated olefin, in the presence of a metallocene-based composite catalyst represented by the following formula (A):

$$R_aMX_bQY_b \qquad (A)$$

(where R each independently represents an unsubstituted or substituted indenyl group, the R being coordinated with M; M represents a lanthanoid element, scandium, or yttrium; X each independently represents a hydrocarbon group having 1 to 20 carbon atoms, the X being μ-coordinated with M and Q; Q represents a Group 13 element in the periodic table; Y each independently represents a hydrocarbon group having 1 to 20 carbon atoms or a hydrogen atom, the Y being coordinated with Q; and a and b each are 2), and preferably in the presence of a metallocene-based composite catalyst represented by the following formula (I):

(where $M^1$ represents a lanthanoid element, scandium, or yttrium; $Cp^R$ each independently represents an unsubstituted or substituted indenyl group; $R^A$ to $R^B$ each independently represent a hydrocarbon group having 1 to 20 carbon atoms, the $R^A$ and $R^B$ being μ-coordinated with $M^1$ and Al; and $R^C$ and $R^D$ each independently represent a hydrocarbon group having 1 to 20 carbon atoms or a hydrogen atom), or in the presence of a polymerization catalyst composition containing the metallocene-based composite catalyst and boron anion.

In the above-described first manufacturing method, copolymerization of a conjugated diene compound and a non-conjugated olefin as monomers can be carried out in a similar manner to a general method of manufacturing a polymer using a general coordination ion polymerization catalyst, except in that the aforementioned metallocene-based composite catalyst or the aforementioned polymerization catalyst composition is used. Further, the copolymer of a conjugated diene compound and a non-conjugated olefin thus obtained has a random sequence having a completely random arrangement of monomer units of the non-conjugated olefin.

It should be noted that any polymerization method may be used, including solution polymerization, suspension polymerization, liquid phase bulk polymerization, emulsion polymerization, gas phase polymerization, solid phase polymerization, and so on. Further, in the case of using a solvent for polymerization, any solvent that is inactive in polymerization can be used, and examples thereof include toluene, hexane, cyclohexane, and a mixture thereof.

The metallocene-based composite catalyst is a compound having: a rare earth element such as lanthanoid element, scandium, or yttrium and a Group 13 element in the periodic table, and preferably represented by the formula (A) or the formula (I). The μ-coordination refers to a state of coordination which forms a crosslinked structure.

In the metallocene-based composite catalyst, the metal represented by M in the formula (A) is a lanthanoid element, scandium, or yttrium. The lanthanoid elements include 15 elements with atomic numbers 57 to 71, and may be any one of them. Preferred examples of the metal represented by M include samarium (Sm), neodymium (Nd), praseodymium (Pr), gadolinium (Gd), cerium (Ce), holmium (Ho), scandium (Sc), and yttrium (Y).

In the formula (A), R each independently represents an unsubstituted or substituted indenyl, the R being coordinated with the metal M. Specific examples of the substituted indenyl group include a 1,2,3-trimethyl indenyl group, a heptamethyl indenyl group, and a 1,2,4,5,6,7-hexamethyl indenyl group.

In the formula (A), Q represents a Group 13 element in the periodic table. Specific examples thereof include boron, aluminum, gallium, indium, and thallium.

In the formula (A), X each independently represents a hydrocarbon group having 1 to 20 carbon atoms, the X being μ-coordinated with M and Q. Examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

In the formula (A), Y each independently represents a hydrocarbon group having 1 to 20 carbon atoms or a hydrogen atom, the Y being coordinated with Q. Examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

On the other hand, in the metallocene-based composite catalyst, the metal represented by $M^1$ in the formula (I) is a lanthanoid element, scandium, or yttrium. The lanthanoid elements include 15 elements with atomic numbers 57 to 71, and may be any one of them. Preferred examples of the metal represented by $M^1$ include samarium (Sm), neodymium (Nd), praseodymium (Pr), gadolinium (Gd), cerium (Ce), holmium (Ho), scandium (Sc), and yttrium (Y).

In the formula (I), $Cp^R$ represents an unsubstituted or substituted indenyl. $Cp^R$ having an indenyl ring as a basic skeleton may be represented by $C_9H_{7-X}R_X$ or $C_9H_{11-X}R_X$. Here, X represents an integer of 0 to 7 or 0 to 11. Further, R each independently preferably represents a hydrocarbyl group or a metalloid group. The hydrocarbyl group preferably has 1 to 20 carbon atoms, more preferably 1 to 10 carbon atoms, and even more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group. Specific examples of the substituted indenyl group include 2-phenyl indenyl and 2-methyl indenyl group. Two $Cp^R$ in the formula (I) may be the same as or different from each other.

In the formula (I), $R^A$ and $R^B$ each independently represent a hydrocarbon group having 1 to 20 carbon atoms, the $R^A$ and $R^B$ being μ-coordinated with $M^1$ and Al. Examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

In the formula (I), $R^C$ and $R^D$ each independently represent a hydrocarbon group having 1 to 20 carbon atoms or a hydrogen atom. Examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

The metallocene-based composite catalyst can be obtained by, for example, reacting with an organic aluminum compound represented by $AlR^K R^L R^M$ in a solvent, the metallocene complex represented by the following formula (II):

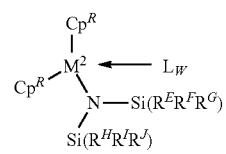

(II)

(where, $M^2$ represents a lanthanoid element, scandium, or yttrium; $Cp^R$ each independently represents an unsubstituted or substituted indenyl group; $R^E$ to $R^J$ each independently represent an alkyl group having 1 to 3 carbon atoms or a hydrogen atom; L represents a neutral Lewis base; and w represents an integer of 0 to 3.) The reaction temperature only needs to be set to about room temperature, and thus the complex can be manufactured in mild conditions. In addition, reaction time is arbitrary, but about several hours to several tens of hours. The reaction solvent is not particularly limited, and any solvent including, for example, toluene and hexane, which are capable of dissolving the raw material and products can be preferably used. The structure of the metallocene-based composite catalyst may preferably be determined by $^1$H-NMR.

In the metallocene complex represented by the formula (II) above, $Cp^R$ is an unsubstituted indenyl or substituted indenyl and has the same meaning as $Cp^R$ in the formula (I) above. Further, in the formula (II), the metal $M^2$ represents a lanthanoid element, scandium, or yttrium, which is equivalent to the metal $M^1$ in the formula (I).

The metallocene complex represented by the general formula (II) includes a silyl amide ligand represented by [—N(SiR$_3$)$_2$]. Each of R groups ($R^E$ to $R^J$ groups) included in the silylamide ligand is independently an alkyl group having 1 to 3 carbon atoms or a hydrogen atom. Also, at least one of $R^E$ to $R^J$ is preferably a hydrogen atom. If at least one of $R^E$ to $R^J$ is a hydrogen atom, it becomes easier to synthesize a catalyst. Additionally, a methyl group is preferred as the alkyl group.

The metallocene complex represented by the formula (II) further includes 0 or 3, preferably 0 to 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same or different from each other.

In addition, the metallocene complex represented by the formula (II) may be present as a monomer, a dimer or a higher-order multimer.

On the other hand, the organic aluminum compound used for generating the above-described metallocene-based composite catalyst is represented by $AlR^KR^LR^M$, where $R^K$ and $R^L$ are independently a univalent hydrocarbon group having 1 to 20 carbon atoms or a hydrogen atom, and $R^M$ is a univalent hydrocarbon group having 1 to 20 carbon atoms, in which $R^M$ may be the same as or different from $R^K$ or $R^L$ above. Examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

Examples of the organic aluminum compound in the formula (X) include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, diisooctyl aluminum hydride; an ethyl aluminum dihydride, a n-propyl aluminum dihydride, and an isobutyl aluminum dihydride; among these, preferred are the triethyl aluminum, the triisobutyl aluminum, the diethyl aluminum hydride, and the diisobutyl aluminum hydride. These organic aluminum compounds may be contained alone or in combination of two or more. The content of the organic aluminum compound to be used for generating the metallocene-based composite catalyst is preferably 2-fold mol to 50-fold mol, and more preferably about 3-fold mol to 5-fold mol, with respect to the metallocene complex.

Further, the polymerization catalyst composition (hereinafter, also referred to as "first polymerization catalyst composition") includes the metallocene-based composite catalyst and boron anion. The first polymerization catalyst composition preferably further includes another component such as a co-catalyst, which is contained in a general polymerization catalyst composition containing a metallocene complex. Here, the first polymerization catalyst composition is also referred to as a two-component catalyst, which has the metallocene-based composite catalyst and boron anion. The first polymerization catalyst composition is capable of producing, similarly to the metallocene-based composite catalyst, a copolymer of a conjugated diene compound and a non-conjugated olefin, which has a random sequence including completely randomly-arranged monomer units of the non-conjugated olefin. In addition, the first polymerization catalyst composition further contains boron anion, which allows the content of each monomer component in the copolymer to be arbitrarily controlled.

In the first polymerization catalyst composition, a specific example of the boron anion forming the two-component catalyst includes a tetravalent boron anion. Examples thereof may include: a tetraphenyl borate, a tetrakis(monofluorophenyl) borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (tripheyl, pentafluorophenyl)borate, a [tris(pentafluorophenyl), phenyl]borate, and a tridecahydride-7, 8-dicarbaundecaborate; among these, preferred is the tetrakis(pentafluorophenyl)borate.

The boron anion may be used as an ionic compound combined with cation. Examples of the cation include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation, and specific examples of the tri (substituted phenyl)carbonium cation include a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri (dimethylphenyl)phosphonium cation. Of these cations, the N,N-dialkylanilinium cations or the carbonium cations are preferred, and the N,N-dialkylanilinium cations are particularly preferred. Therefore, preferred examples of the ionic compound include a N,N-dimethylanilinium tetrakis(pentafluorophenyl)borate and a triphenylcarbonium tetrakis (pentafluorophenyl)borate. The content of the ionic compound including a boron anion and a cation may preferably be added by 0.1-fold mol to 10-fold mol, and more preferably by about 1-fold mol, with respect to the metallocene-based composite catalyst.

Preferred examples of the co-catalyst that can be contained in the first polymerization catalyst composition may include an organic aluminum compound represented by the $AlR^KR^LR^M$, and also preferably include aluminoxanes. The aluminoxane is preferably an alkyl aluminoxane, examples of which include methyl aluminoxane (MAO) and modified methyl aluminoxane. In addition, preferred examples of the modified methyl aluminoxane include MMAO-3A (manufactured by Tosoh Finechem Corporation). These aluminoxanes may be contained alone or in combination of two or more.

In the first method of manufacturing the copolymer of a conjugated diene compound and a non-conjugated olefin according to the present invention, the polymerization can be carried out similarly to a general method of manufacturing a copolymer using a coordination ion polymerization catalyst, except in that the metallocene-based composite catalyst or the first polymerization catalyst composition is used as described above. Here, in the case of carrying out the method of manufacturing the copolymer of the present invention using the first polymerization catalyst composition, the method can be performed in either one of the following manners. That is, for example, (1) the components forming the two-component catalyst may be separately provided in the polymerization reaction system including, as monomers, a conjugated diene compound and a non-conjugated olefin, to thereby prepare the first polymerization catalyst composition in the reaction system, or (2) the first polymerization catalyst composition prepared in advance may be provided into the polymerization reaction system. The amount of the metallocene-based composite catalyst to be used is preferably set to fall within a range of 0.0001-fold mol to 0.01-fold mol with respect to the total amount of the conjugate diene compound and the non-conjugated olefin.

Further, in the first method of manufacturing the copolymer of a conjugated diene compound and a non-conjugated olefin according to the present invention, a terminator such as ethanol and isopropanol may be used to stop the polymerization.

Further, according to the first method of manufacturing the copolymer of a conjugated diene compound and a non-conjugated olefin of the present invention, the polymerization reaction of the conjugated diene compound and the non-conjugated olefin may preferably be performed in an inert gas atmosphere, and preferably in an nitrogen or argon gas atmosphere. The polymerization temperature of the polymerization reaction is not particularly limited, and preferably in a range of, for example, −100° C. to 200° C., and may also be set to temperatures around room temperature. An increase in polymerization temperature may reduce the cis-1,4-selectivity in the polymerization reaction. The polymerization reaction is preferably performed under pressure in a range of 0.1 MPa to 10 MPa so as to allow the conjugated diene compound and the non-conjugated olefin to be sufficiently introduced into the polymerization system. Further, the reaction time of the polymerization reaction is not particularly limited, and may preferably be in a range of, for example, 1 second to 10 days, which may be selected as appropriate depending on the conditions such as the type of the monomers to be polymerized, the type of the catalyst, and the polymerization temperature.

Further, according to the first method of manufacturing the copolymer of a conjugated diene compound and a non-conjugated olefin of the present invention, in polymerizing the conjugated diene compound and the non-conjugated olefin, the concentration of the conjugated diene compound (mol/L) and the concentration of the non-conjugated olefin (mol/L) at the start of copolymerization preferably satisfy the following relation:

concentration of non-conjugated olefin/concentration of conjugated diene compound ≥1.0;

further preferably satisfy the following relation:

concentration of non-conjugated olefin/concentration of conjugated diene compound ≥1.3;

and still further preferably satisfy the following relation:

concentration of non-conjugated olefin/concentration of conjugated diene compound ≥1.7.

The ratio of the concentration of the non-conjugated olefin to the concentration of the conjugated diene compound is defined to be at least 1, to thereby efficiently introduce the non-conjugated olefin into the reaction mixture.

The copolymer of a conjugated diene compound and a non-conjugated olefin of the present invention can be manufactured by controlling the introduction of monomers to a polymerization system, even without using the metallocene-based composite catalyst or the first polymerization catalyst composition. Specifically, a second method of manufacturing the copolymer according to the present invention has a feature in that charging of a conjugated diene compound is controlled in the presence of a non-conjugated olefin so as to organize the chain structure of the copolymer, to thereby control the arrangement of monomer units in the copolymer. As used herein, the term "polymerization system" refers to the location where a conjugated diene compound and a non-conjugated olefin are copolymerized, and specific examples thereof include a reaction container.

Charging of a conjugated diene compound may be performed by using either continuous charging or separate charging, and furthermore, a combination of both. As used herein, the continuous charging refers to, for example, adding a conjugated diene compound at a certain addition rate for a certain period.

Specifically, the concentration ratio of monomers in the polymerization system may be controlled by separate or continuous charging of a conjugated diene compound into a polymerization system for copolymerizing a conjugated diene compound and a non-conjugated olefin. This allows structural characterization of the chain structure (i.e., the arrangement of monomer units) in the resulting copolymer. Further, a conjugated diene compound may be charged into the polymerization system in the presence of a non-conjugated olefin, suppressing generation of homopolymer of the conjugated diene compound. The charging of the conjugated diene compound may be performed after the initiation of the polymerization of the non-conjugated olefin.

For example, if a random copolymer is manufactured by using the above-described second manufacturing method, it is effective to further introduce, in the presence of a non-conjugated olefin, a conjugated diene compound one or more times into a polymerization reaction system in which polymerization of the conjugated diene compound and the non-conjugated olefin has been initiated, or to continuously introduce, in the presence of a non-conjugated olefin, a conjugated diene compound into a polymerization reaction system for polymerizing the conjugated diene compound and the non-conjugated olefin.

The aforementioned second manufacturing method is not particularly limited as long as the way of charging monomers into a polymerization system is specified as described above, and an arbitrary polymerization method may be employed including, for example, solution polymerization, suspension polymerization, liquid phase bulk polymerization, emulsion polymerization, vapor phase polymerization, and solid state polymerization. Further, the aforementioned second manufacturing method may be performed in a similar manner to the first manufacturing method to copolymerize a conjugated diene compound and a non-conjugated olefin as monomers, except in that the way of charging monomers into the polymerization system is specified as described above.

In the aforementioned second manufacturing method, it is necessary to control the way of charging a conjugated diene compound; specifically, it is preferred to control how much and how many times a conjugated diene compound should be charged. Examples of the method of controlling the introduction of the conjugated diene compound may include, but not limited to: a controlling method based on a computer program or the like; and an analog control method with the use of a timer or the like. Further, as described above, the way of charging a conjugated diene compound is not particularly limited, including continuous charging and separate charging. In the case of separate charging of a conjugated diene compound, the number of times to charge the conjugated diene compound is not particularly limited.

Further, the aforementioned second manufacturing method requires the presence of a non-conjugated olefin in the polymerization system at the time of charging a conjugated diene compound into the polymerization system. It is thus preferred to continuously feed a non-conjugated olefin to the polymerization system. In addition, the way of feeding a non-conjugated olefin is not particularly limited.

According to the second method of manufacturing the copolymer of the present invention, it is preferred to polymerize a conjugated diene compound and a non-conjugated olefin in the presence of the following polymerization catalyst composition, in view of efficiently enhancing the polymerization. Further, in the case of using a solvent for polymerization, any solvent that is inactive in polymerization can be used, and an example thereof includes toluene.

An example of the aforementioned polymerization catalyst composition preferably includes a polymerization catalyst composition (hereinafter, also referred to as "second polymerization catalyst composition") including at least one complex selected from the group consisting of: a metallocene complex represented by the following general formula (III); a metallocene complex represented by the following general formula (IV); and a half metallocene cation complex represented by the following general formula (V):

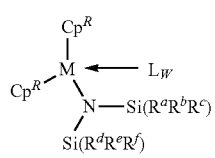

(III)

(In the formula (III), M represents a lanthanoid element, scandium, or yttrium; $Cp^R$ each independently represents an unsubstituted or substituted indenyl group; $R^a$ to $R^f$ each independently represent an alkyl group having 1 to 3 carbon atoms or a hydrogen atom; L represents a neutral Lewis base; and w represents an integer of 0 to 3);

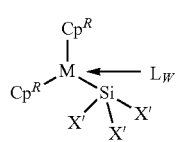

(IV)

(In the formula (IV), M represents a lanthanoid element, scandium, or yttrium; $Cp^R$ each independently represents an unsubstituted or substituted indenyl group; X' each represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3); and

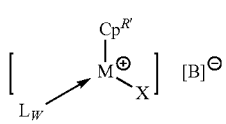

(V)

(In the formula (V), M represents a lanthanoid element, scandium, or yttrium; CpR' represents an unsubstituted or substituted cyclopentadienyl, indenyl, fluorenyl group; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3; and [B]⁻ represents a non-coordinating anion). The second polymerization catalyst composition may further include another component such as a co-catalyst, which is contained in a general polymerization catalyst composition containing a metallocene complex. As used herein, the metallocene complex is a complex compound having one or more cyclopentadienyl groups or derivative of cyclopentadienyl groups bonded to the central metal. In particular, a metallocene complex may be referred to as a "half metallocene complex" when the number of cyclopentadienyl group or derivative thereof bonded to the central metal is one. In the polymerization system, the concentration of the complex contained in the second polymerization catalyst composition is preferably defined to fall within a range of 0.1 mol/L to 0.0001 mol/L.

In the metallocene complex represented by the general formulae (III) and (IV) above, $Cp^R$ in the formulae represents an unsubstituted or substituted indenyl group. $Cp^R$ having an indenyl ring as a basic skeleton may be represented by $C_9H_{7-X}R_X$ or $C_9H_{11-X}R_X$. Here, X represents an integer of 0 to 7 or 0 to 11. Further, R each independently preferably represents a hydrocarbyl group or a metalloid group. The hydrocarbyl group preferably has 1 to 20 carbon atoms, more preferably 1 to 10 carbon atoms, and even more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group. Specific examples of the substituted indenyl group include 2-phenyl indenyl and 2-methyl indenyl group. Two $Cp^R$ in the general formulae (III) and (IV) may be the same as or different from each other.

In the half metallocene cation complex represented by the general formula (V), $Cp^{R'}$ in the formula represents a substituted or unsubstituted cyclopentadienyl, indenyl, or fluorenyl group, with the substituted or unsubstituted indenyl group being preferred. $Cp^{R'}$ having a cyclopentadienyl ring as a basic skeleton is represented by $C_5H_{5-X}R_X$. Here, X represents an integer of 0 to 5. Further, R each independently preferably represents a hydrocarbyl group or a metalloid group. The hydrocarbyl group preferably has 1 to 20 carbon atoms, more preferably 1 to 10 carbon atoms, and even more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group. $Cp^{R'}$ having a cyclopentadienyl ring as a basic skeleton is specifically exemplified as follows.

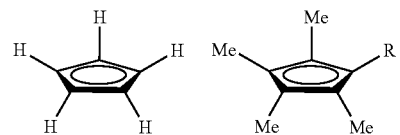

(In the formula, R represents a hydrogen atom, a methyl group, or an ethyl group.)

In the general formula (V), $Cp^{R'}$ having an indenyl ring as a basic skeleton is defined as the same as $Cp^R$ in the general formula (III), and preferred examples thereof are also the same as those of $Cp^R$ in the general formula (III).

In the general formula (V), $Cp^{R'}$ having the fluorenyl ring above as a basic skeleton may be represented by $C_{13}H_{9-X}R_X$ or $C_{13}H_{17-X}R_X$. Here, X represents an integer of 0 to 9 or 0 to 17. Further, R each independently preferably represents a hydrocarbyl group or a metalloid group. The hydrocarbyl group preferably has 1 to 20 carbon atoms, more preferably 1 to 10 carbon atoms, and even more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group.

The central metal represented by M in the general formulae (III), (IV), and (V) represents a lanthanoid element, scandium, or yttrium. The lanthanoid elements include 15 elements with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y).

The metallocene complex represented by the formula (III) above includes a silylamide ligand [—N(SiR$_3$)$_2$]. Groups represented by R (R$^a$ to R$^f$ in the general formula (I)) in the silyl amide ligand each independently represent a hydrogen atom or an alkyl group having 1 to 3 carbon atoms, and it is preferred that at least one of R$^a$ to R$^f$ represents a hydrogen atom. With at least one of R$^a$ to R$^f$ representing a hydrogen atom, the catalyst can be synthesized with ease, and the bulkiness around silicon can be reduced, to thereby allow the non-conjugated olefin to be easily introduced. Based on the same objective, it is further preferred that at least one of R$^a$ to R$^c$ represents a hydrogen atom, and at least one of R$^d$ to R$^f$ represents a hydrogen atom. Additionally, a methyl group is preferred as the alkyl group.

The metallocene complex represented by the general formula (IV) includes a silyl ligand represented by [—SiX'$_3$]. X' in the silyl ligand represented by [—SiX'$_3$] is a group defined as the same as X in the general formula (V) described below, and preferred examples thereof are also the same as those of X in the general formula (V).

In the general formula (V), X represents a group selected from the group consisting of a hydrogen atom, a halogen atom, an alkoxide group, a thiolate group, an amide group, a silyl group, and a hydrocarbon group having 1 to 20 carbon atoms. In the general formula (V), the alkoxide group may be any one of aliphatic alkoxy groups such as a methoxy group, an ethoxy group, a propoxy group, an n-butoxy group, an isobutoxy group, a sec-butoxy group, and a tert-butoxy group; and aryl oxide groups (aromatic alkoxy groups) such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group. Among these, preferred is the 2,6-di-tert-butylphenoxy group.

In the general formula (V), the thiolate group represented by X may be any one of: aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group. Among these, preferred is the 2,4,6-triisopropylthiophenoxy group.

In the general formula (V), the amide group represented by X may be any one of: aliphatic amide groups such as a dimethyl amide group, a diethyl amide group, and a diisopropyl amide group; aryl amide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tri-tert-butylphenyl amide group; and bistrialkylsilyl amide groups such as a bistrimethylsilyl amide group. Among these, preferred is the bistrimethylsilyl amide group.

In the general formula (V), the silyl group represented by X may be any one of a trimethylsilyl group, a tris(trimethylsilyl) silyl group, a bis(trimethylsilyl)methylsilyl group, a trimethylsilyl(dimethyl)silyl group, and a triisopropylsilyl(bistrimethylsilyl)silyl group. Among these, preferred is the tris(trimethylsilyl)silyl group.

In the general formula (V), the halogen atom represented by X may be any one of a fluorine atom, a chlorine atom, a bromine atom, and an iodine atom, with the chlorine atom and the iodine atom being preferred. Specific examples of the hydrocarbon group having 1 to 20 carbon atoms represented by X include: linear or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups such as a trimethylsilylmethyl group and a bistrimethylsilylmethyl group each containing a silicon atom; among these, preferred are the methyl group, the ethyl group, the isobutyl group, the trimethylsilylmethyl group, and the like.

In the general formula (V), the bistrimethylsilyl amide group or the hydrocarbon group having 1 to 20 carbon atoms is preferred as X.

In the general formula (V), examples of the non-coordinating anion represented by [B]$^-$ include tetravalent boron anions. Specific examples of the tetravalent boron anions may include a tetraphenyl borate, a tetrakis(monofluorophenyl) borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra (xylyl)borate, a (tripheyl, pentafluorophenyl)borate, a [tris (pentafluorophenyl), phenyl]borate, and a tridecahydride-7, 8-dicarbaundecaborate; among these, preferred is the tetrakis (pentafluorophenyl)borate.

The metallocene complexes represented by the general formulae (III) and (IV) and the half metallocene cation complex represented by the general formula (V) may include 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same or different from each other.

The metallocene complexes represented by the general formulae (III) to (IV), and the half metallocene cation complex represented by the general formula (V) may be each present as a monomer, a dimer or a higher-order multimer.

The metallocene complex represented by the general formula (III) can be obtained by, for example, subjecting a lanthanoid trishalide, a scandium trishalide, or a yttrium trishalide to reaction in a solvent with a salt of indenyl (for example, a potassium salt or a lithium salt) and a salt of bis(trialkylsilyl)amide (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that dissolves the raw material and products being preferred, and for example, toluene may be used. In the following, a reaction example for obtaining the metallocene complex represented by the general formula (III) is described.

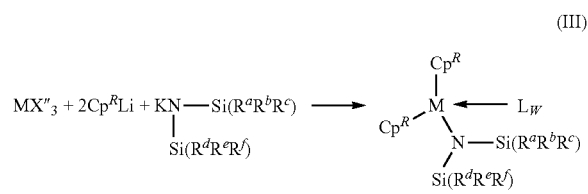

(In the Formula, X" represents a halide.)

The metallocene complex represented by the general formula (IV) can be obtained by, for example, subjecting a lanthanoid trishalide, a scandium trishalide, or a yttrium trishalide to reaction in a solvent with a salt of indenyl (for example, a potassium salt or a lithium salt) and a salt of silyl (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that dissolves the raw material and products being preferred, and for example, toluene may be used. In the following, a reaction example for obtaining the metallocene complex represented by the general formula (IV) is described.

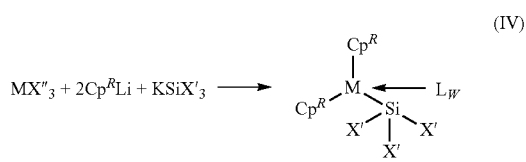

(In the Formula, X" represents a halide.)

The half metallocene cation complex represented by the general formula (V) can be obtained by, for example, the following reaction.

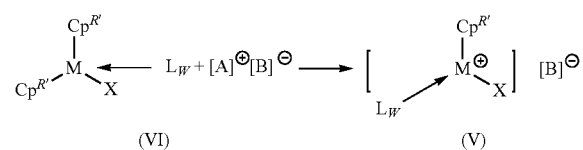

In the general formula (VI), M represents a lanthanoid element, scandium, or yttrium; $Cp^{R'}$ each independently represents an unsubstituted or substituted cyclopentadienyl, indenyl, or fluorenyl group; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3. Further, in the general formula $[A]^+[B]^-$ representing an ionic compound, $[A]^+$ represents a cation; and $[B]^-$ represents a non-coordinating anion.

Examples of the cation represented by $[A]^+$ include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation, and specific examples of the tri(substituted phenyl)carbonium cation include a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri (dimethylphenyl)phosphonium cation. Of these cations, the N,N-dialkylanilinium cations or the carbonium cations are preferred, and the N,N-dialkylanilinium cations are particularly preferred.

The ionic compound used in the above reaction and represented by the general formula $[A]^+[B]^-$ may preferably be a compound obtained by combining any one selected from the non-coordinating anions described above and any one selected from the cations described above. Specific examples thereof preferably include a N,N-dimethylanilinium tetrakis(pentafluorophenyl)borate and a triphenylcarbonium tetrakis(pentafluorophenyl)borate. The ionic compound represented by the general formula $[A]^+[B]^-$ is added in an amount of preferably 0.1-fold mol to 10-fold mol and more preferably about 1-fold mol, with respect to the metallocene complex.

When the half metallocene cation complex represented by the general formula (V) is used in polymerization reaction, the half metallocene cation complex represented by the general formula (V) may be directly supplied to the polymerization system, or alternatively, the compound represented by the general formula (VI) used in the above reaction and the ionic compound represented by the general formula $[A]^+[B]^-$ may be separately supplied to the polymerization system, to thereby form the half metallocene cation complex represented by the general formula (V) in the reaction system. In addition, the half metallocene cation complex represented by the general formula (V) may be formed in the reaction system by using the metallocene complex represented by the general formula (III) or (IV) and the ionic compound represented by the general formula $[A]^+[B]^-$ in combination.

Structures of the metallocene complex represented by the general formula (III) or (IV) and of the half metallocene cation complex represented by the general formula (V) is preferably determined by X-ray crystallography.

The co-catalyst that can be contained in the second polymerization catalyst composition may be arbitrarily selected from components used as the co-catalyst for the general polymerization catalyst composition containing a general metallocene complex. Preferred examples of the co-catalyst include aluminoxanes, organic aluminum compounds, and the above ionic compounds. These co-catalysts may be contained alone or in combination of two or more.

The aluminoxane is preferably an alkyl aluminoxane, examples of which include methyl aluminoxane (MAO) and modified methyl aluminoxane. In addition, preferred examples of the modified methyl aluminoxane include MMAO-3A (manufactured by Tosoh Finechem Corporation). The content of the aluminoxane in the second polymerization catalyst composition is preferably about 10 to 1,000, more preferably about 100, at an element ratio (Al/M) of the aluminum element Al of the aluminoxane to the central metal element M in the metallocene complex.

On the other hand, a preferred example of the organic aluminum compounds may include an organic aluminum compound represented by the general formula AlRR'R" (where R and R' each independently represent a hydrocarbon group of $C_1$ to $C_{10}$ or a hydrogen atom, and R" is a hydrocarbon group of $C_1$ to $C_{10}$). In addition, specific examples of the organic aluminum compound include a trialkyl aluminum, a dialkyl aluminum chloride, an alkyl aluminum dichloride, and a dialkyl aluminum hydride; among these, preferred is the trialkyl aluminum. Further, examples of the trialkyl aluminum include triethyl aluminum and triisobutyl aluminum. The content of the organic aluminum compound in the second polymerization catalyst composition is preferably 1-fold mol to 50-fold mol and more preferably about 10-fold mol, with respect to the metallocene complex.

In the second polymerization catalyst composition, the metallocene complex represented by the general formulae (III) and (IV) and the half metallocene cation complex represented by the general formula (V) may be combined with an appropriate co-catalyst, to thereby increase the cis-1,4 bond content and the molecular weight of a copolymer to be obtained.

Another preferred example of the aforementioned polymerization catalyst composition may include: a polymerization catalyst composition (hereinafter, also referred to as "third polymerization catalyst composition") containing: component (A): a rare earth element compound or a reactant of a rare earth element compound and a Lewis base, with no bond formed between the rare earth element and carbon; component (B): at least one selected from the group consisting of: an ionic compound (B-1) composed of a non-coordinating anion and a cation; an aluminoxane (B-2); and at least one kind of halogen compound (B-3) from among a Lewis acid, a complex compound of a metal halide and a Lewis base, and an organic compound containing active halogen. Further, if the polymerization catalyst composition contains at least one kind of the ionic compound (B-1) and the halogen compound (B-3), the polymerization catalyst composition further contains: component (C): an organic metal compound represented by the following general formula (i):

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table). The ionic compound (B-1) and the halogen compound (B-3) do not have carbon atoms to be fed to the component (A), and thus the component (C) becomes necessary as a source of feeding carbon to the component (A). Here, the polymerization catalyst composition still may include the component (C) even if the polymerization catalyst composition includes the aluminoxane (B-2). Further, the polymerization catalyst composition may further include another component such as a co-catalyst, which is contained in a general rare earth element compound-based polymerization catalyst composition. In the polymerization system, the concentration of the component (A) contained in the third polymerization catalyst composition is preferably defined to fall within a range of 0.1 mol/L to 0.0001 mol/L.

The component (A) contained in the third polymerization catalyst composition is a rare earth element compound or a reactant of the rare earth element compound and a Lewis base. Here, a rare earth element compound or a reactant of the rare earth element compound and a Lewis base do not have a bond formed between the rare earth element and carbon. When the rare earth element compound or a reactant thereof does not have a direct bond of a rare earth element and carbon, the resulting compound is stable and easy to handle. As used herein, the rare earth element compound refers to a compound containing a lanthanoid element, scandium, or yttrium. The lanthanoid elements include elements with atomic numbers 57 to 71 of the periodic table. Specific examples of the lanthanoid element include lanthanum, cerium, praseodymium, neodymium, promethium, samarium, europium, gadolinium, terbium, dysprosium, holmium, erbio, tulio, itterbio, and lutezio. These components (A) may be contained alone or in combination of two or more.

The rare earth element compound is preferably composed of a rare earth metal of a bivalent or trivalent salt or of a complex compound, and further preferably a rare earth element compound containing at least one ligand selected from a hydrogen atom, a halogen atom, and an organic compound residue. Further, the rare earth element compound or the reactant of the rare earth element compound and the Lewis base is represented by the following general formula (XI) or (XII):

(where: $M^{11}$ represents a lanthanoid element, scandium, or yttrium; $X^{11}$ each independently represent a hydrogen atom, a halogen atom, an alkoxide group, a thiolate group, an amide group, a silyl group, an aldehyde residue, a ketone residue, a carboxylic acid residue, a thiocarboxylic acid residue, or a phosphorous compound residue; $L^{11}$ represents a Lewis base; and w represents 0 to 3).

Specific examples of a group (ligand) to form a bond to the rare earth element of the rare earth element compound include: a hydrogen atom; aliphatic alkoxy groups such as a methoxy group, an ethoxy group, a propoxy group, an n-butoxy group, an isobutoxy group, a sec-butoxy group, and a tert-butoxy group; aromatic alkoxy groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group; aliphatic thiolate groups such as thiomethoxy group, a thioethoxy group, a thiopropoxy group, a thio-n-butoxy group, a thioisobutoxy group, a thio-sec-butoxy group, and a thio-tert-butoxy group; aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group; aliphatic amide groups such as a dimethyl amide group, a diethyl amide group, a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; bis-trialkylsilyl amide groups such as a bistrimethylsilyl amide group; silyl groups such as a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group; halogen atoms such as a fluorine atom, a chlorine atom, a bromine atom, and an iodine atom. Other examples may include: residues of aldehyde such as salicylaldehyde, 2-hydroxy-1-naphthaldehyde, and 2-hydroxy-3-naphthaldehyde; residues of hydroxyphenone such as 2'-hydroxyacetophenone, 2'-hydroxybutyrophenone, and 2'-hydroxypropiophenone; residues of diketone such as acetylacetone, benzoylacetone, propionylaceton, isobutyl acetone, valerylacetone, and ethylacetylacetone; residues of an carboxylic acid such as an isovaleric acid, a caprylic acid, an octanoic acid, a lauric acid, a myristic acid, a palmitic acid, a stearic acid, an isostearic acid, an oleic acid, a linoleic acid, a cyclopentanecarboxylic acid, a naphthenic acid, an ethylhexanoic acid, a pivalic acid, a versatic acid (trade name of a product manufactured by Shell Chemicals Japan Ltd., a synthetic acid composed of a mixture of C10 monocarboxylic acid isomers), a phenylacetic acid, a benzoic acid, 2-naphthoate acid, a maleic acid, and a succinic acid; residues of thiocarboxylic acid such as a hexanethioic acid, 2,2-dimethylbutanethioic acid, a decanethioic acid, and a thiobenzoic acid; residues of phosphoric acid ester such as a phosphoric acid dibutyl, a phosphoric acid dipentyl, a phosphoric acid dihexyl, a phosphoric acid diheptyl, a phosphoric acid dioctyl, phosphoric acid bis(2-ethylhexyl), a phosphoric acid bis(1-methylheptyl), a phosphoric acid dilauryl, a phosphoric acid dioleyl, a phosphoric acid diphenyl, a phosphoric acid bis(p-nonylphenyl), a phosphoric acid bis(polyethylene glycol-p-nonylphenyl), a phosphoric acid (butyl)(2-ethylhexyl), a phosphoric acid(1-methylheptyl)(2-ethylhexyl), and a phosphoric acid(2-ethylhexyl)(p-nonylphenyl); residues of phosphonic acid ester such as a 2-ethylhexyl phosphonic acid monobutyl, a 2-ethylhexyl phosphonic acid mono-2-ethylhexyl, a phenylphosphonic acid mono-2-ethylhexyl, a 2-ethylhexyl phosphonic acid mono-p-nonylphenyl, a phosphonic acid mono-2-ethylhexyl, a phosphonic acid mono-1-methylheptyl, and a phosphonic acid mono-p-nonylphenyl; residues of phosphinic acid such as a dibutylphosphinic acid, a bis(2-ethylhexyl)phosphinic acid, a bis(1-methylheptyl)phosphinic acid, a dilauryl phosphinic acid, a dioleyl phosphinic acid, a diphenyl phosphinic acid, a bis(p-nonylphenyl)phosphinic acid, a butyl(2-ethylhexyl) phosphinic acid, (2-ethylhexyl)(1-methylheptyl)phosphinic acid, an (2-ethylhexyl)(p-nonylphenyl) phosphinic acid, a butyl phosphinic acid, 2-ethylhexyl phosphinic acid, a 1-methylheptyl phosphinic acid, an oleyl phosphinic acid, a lauryl phosphinic acid, a phenyl phosphinic acid, and a p-nonylphenyl phosphinic acid. These ligands may be used alone or in combination of two or more. Of those, amide groups, which easily form active species through reaction with cocatalyst, are preferred.

As to the component (A) used in the third polymerization catalyst composition, examples of the Lewis base to react with the rare earth element compound may include: tetrahydrofuran; diethyl ether; dimethylaniline; trimethylphosphine; lithium chloride, neutral olefins, and neutral diolefins. Here, in the case where the rare earth element compound reacts with a plurality of Lewis bases (in the case where w is 2 or 3 in Formulae (XI) and (XII)), the Lewis base $L^{11}$ in each formula may be the same as or different from each other.

The component (B) contained in the third polymerization catalyst composition is at least one compound selected from the group consisting of: an ionic compound (B-1); an aluminoxane (B-2); and a halogen compound (B-3). The total content of the component (B) contained in the third polymerization catalyst composition is preferably defined to fall within a range of 0.1-fold mol to 50-fold mol, with respect to the component (A).

The ionic compound represented by (B-1) is formed of non-coordinating anion and cation, and an example thereof includes: an ionic compound that reacts with the rare earth element compound as the component (A) or with the reactant resulting from Lewis base and the rare earth element compound, so as to form a cationic transition metal compound. Examples of the non-coordinating anion may include a tetraphenyl borate, a tetrakis(monofluorophenyl)borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (tripheyl, pentafluorophenyl)borate, a [tris(pentafluorophenyl), phenyl]borate, and a tridecahydride-7,8-dicarbaundecaborate. Meanwhile, examples of the cation may include a carbonium cation, an oxonium cation, an ammonium cation, a phosphonium cation, a cycloheptatrienyl cation, and a ferrocenium cation containing a transition metal. Specific examples of the carbonium cation include trisubstituted carbonium cations such as a triphenylcarbonium cation and a tri(substituted phenyl)carbonium cation, and more specific examples of the tri(substituted phenyl) carbonium cation include a tri(methylphenyl)carbonium cation and a tri(dimethylphenyl)carbonium cation. Examples of the ammonium cation include: trialkylammonium cations such as a trimethylammonium cation, a triethylammonium cation, a tripropylammonium cation, and a tributylammonium cation (such as a tri(n-butyl)ammonium cation); N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri(dimethylphenyl)phosphonium cation. Therefore, the ionic compound may preferably be a compound obtained by combining any one selected from the non-coordinating anions described above and any one selected from the cations described above. Specific examples thereof preferably include a N,N-dimethylanilinium tetrakis(pentafluorophenyl)borate and a triphenylcarbonium tetrakis(pentafluorophenyl)borate. These ionic compounds may be contained alone or in combination of two or more. The content of the ionic compound in the third polymerization catalyst composition is preferably 0.1-fold mol to 10-fold mol, and more preferably about 1-fold mol, with respect to the component (A).

The aluminoxane represented by (B-2) is a compound obtained by contacting an organic aluminum compound with a condensation agent, and examples thereof include: a chain type aluminoxane or a cyclic aluminoxane, both having a repeating unit represented by the general formula (—Al(R') O—) (where R' is a hydrocarbon group having 1 to 10 carbon atoms and may be partly substituted with halogen atom and/or alkoxy group, and the polymerization degree of the repeating unit is preferably at least 5, more preferably at least 10). Here, specific examples of R' include a methyl group, an ethyl group, a propyl group, and isobutyl group, with the methyl group being preferred. Further, examples of the organic aluminum compound used as a raw material of the aluminoxane may include: trialkyl aluminums such as trimethyl aluminum, triethyl aluminum, triisobutyl aluminum and the like; and mixtures thereof, with the trimethyl aluminum being particularly preferred. For example, an aluminoxane obtained using, as a raw material, a mixture of trimethyl aluminum and tributyl aluminum can be suitably used. The content of aluminoxane in the third polymerization catalyst composition is preferably about 10 to 1,000 at an element ratio (Al/M) of the aluminum element Al of the aluminoxane to the rare earth element M forming the component (A).

The halogen compound represented by (B-3) includes at least one of: a Lewis acid; a complex compound of a metal halide and a Lewis base; and an organic compound containing active halogen, and is capable of reacting with, for example, the rare earth element compound as the component (A) or with the reactant resulting from Lewis base and the rare earth element compound, so as to form a compound, such as a halogenated transition metal compound or a compound with a charge-deficient transition metal center. The content of the halogen compound in the third polymerization catalyst composition is preferably 1-fold mol to 5-fold mol, with respect to the component (A).

Examples of the Lewis acid may include: a boron-containing halogen compound such as $B(C_6F_5)_3$ and an aluminum-containing halogen compound such as $Al(C_6F_5)_3$, and may also include a halogen compound containing an element of Group III, Group IV, Group V, Group VI, and Group VIII of the periodic table. Preferred examples thereof include an aluminum halide or an organometallic halide. Preferred examples of the halogen element include chlorine and bromine. Specific examples of the Lewis acid include: a methyl aluminum dibromide; a methyl aluminum dichloride; an ethyl aluminum dibromide; an ethyl aluminum dichloride; a butyl aluminum dibromide; a butyl aluminum dichloride; a dimethyl aluminum bromide; a dimethyl aluminum chloride; a diethyl aluminum bromide; a diethyl aluminum chloride; a dibutyl aluminum bromide; a dibutyl aluminum chloride; a methyl aluminum sesquibromide; a methyl aluminum sesquichloride; a ethyl aluminum sesquibromide; an ethyl aluminum sesquichloride; a dibutyltin dichloride; an aluminum tribromide; an antimony trichloride; an antimony pentachloride; a phosphorus trichloride; a phosphorus pentachloride; a tin tetrachloride; a titanium tetrachloride; and tungsten hexachloride. Among these, particularly preferred are the diethyl aluminum chloride, the ethyl aluminum sesquichloride, the ethyl aluminum dichloride, the diethyl aluminum bromide, the ethyl aluminum sesquibromide, and the ethyl aluminum dibromide.

Preferred examples of the metal halide forming a complex compound of the metal halide and a Lewis base include: a beryllium chloride, a beryllium bromide; a beryllium iodide; a magnesium chloride; a magnesium bromide; a magnesium iodide; a calcium chloride; a calcium bromide; a calcium iodide; a barium chloride; a barium bromide; a barium iodide; a zinc chloride; a zinc bromide; a zinc iodide; a cadmium chloride; a cadmium bromide; a cadmium iodide; a mercury chloride; a mercury bromide; a mercury iodide; a manganese chloride; a manganese bromide; a manganese iodide; a rhenium chloride; a rhenium bromide; a rhenium iodide; a copper chloride; a copper iodide; a silver chloride; a silver bromide; a silver iodide; a gold chloride; a gold iodide; and a gold bromide. Among these, particularly preferred are the magnesium chloride, the calcium chloride, the barium chloride, the manganese chloride, the zinc chloride, and the copper chloride being preferred, and the magnesium chloride, the manganese chloride, the zinc chloride, and the copper chloride.

Preferred examples of the Lewis base forming a complex compound of the metal halide and the Lewis base include: a phosphorus compound; a carbonyl compound; a nitrogen compound; an ether compound; and an alcohol. Specific examples thereof include: a tributyl phosphate; a tri-2-ethylhexyl phosphate; a triphenyl phosphate; a tricresyl phosphate; a triethylphosphine; a tributylphosphine; a triphenylphosphine; a diethylphosphinoethane; a diphenylphosphinoethane; an acetylacetone; a benzoylacetone; a propionitrileacetone; a valerylacetone; an ethylacetylacetone; a methyl acetoacetate; an ethyl acetoacetate; a phenyl acetoacetate; a dimethyl malonate; a diethyl malonate; a diphenyl malonate; an acetic acid; an octanoic acid; a 2-ethylhexoic acid; an oleic acid; a stearic acid; a benzoic acid; a naphthenic acid; a versatic acid; a triethylamine; a N,N-dimethylacetamide; a tetrahydrofuran; a diphenyl ether; a 2-ethylhexyl alcohol; an oleyl alcohol; stearyl alcohol; a phenol; a benzyl alcohol; a 1-decanol; and a lauryl alcohol. Among these, preferred are the tri-2-ethylhexyl phosphate, the tricresyl phosphate; the acetylacetone, the 2-ethylhexoic acid, the versatic acid, the 2-ethylhexyl alcohol; the 1-decanol; and the lauryl alcohol.

The Lewis base is subjected to reaction with the metal halide in the proportion of 0.01 mol to 30 mol, preferably 0.5 mol to 10 mol, per 1 mol of the metal halide. The use of the reactant obtained from the reaction of the Lewis base can reduce residual metal in the polymer.

An example of the organic compound containing active halogen includes benzyl chloride.

The component (C) contained in the third polymerization catalyst composition is an organic metal compound represented by the general formula (i):

$$YR^1_a R^2_b R^3_c \qquad (i)$$

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table), and is preferably an organic aluminum compound represented by the general formula (X):

$$AlR^{11}R^{12}R^{13} \qquad (X)$$

(where $R^{11}$ and $R^{12}$ are the same or different hydrocarbon groups each having 1 to 10 carbon atoms or a hydrogen atom; and $R^{13}$ is a hydrocarbon group having 1 to 10 carbon atoms, in which $R^{13}$ may be the same as or different from $R^{11}$ or $R^{12}$ above). Examples of the organic aluminum compound in the formula (X) include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. The organic metal compounds as the component (C) may be contained alone or in combination of two or more. The content of the organic aluminum compound in the third polymerization catalyst composition is preferably 1-fold mol to 50-fold mol, and more preferably about 10-fold mol, with respect to the component (A).

Rubber Composition

The rubber composition of the present invention is not particularly limited as long as the copolymer of the present invention is contained, and may be selected as appropriate depending on the application thereof. The rubber composition preferably contains rubber components other than the copolymer of the present invention, such as an inorganic filler, a carbon black, and a crosslinking agent.

Copolymer

The content of the copolymer of the present invention in the rubber components is not particularly limited, and may be selected as appropriate depending on the application thereof. The preferred content of the copolymer is at least 3 mass %. The content of the copolymer in the rubber components falling short of 3 Mass % may diminish the effect of the present invention or develop no effect at all.

Rubber Components

The rubber components are not particularly limited and may be selected as appropriate depending on the application thereof. Examples thereof include: the copolymer of the present invention, natural rubber, various types of butadiene rubber, various types of styrene-butadiene copolymer rubber, isoprene rubber, butyl rubber, a bromide of a copolymer of isobutylene and p-methylstyrene, halogenated butyl rubber, acrylonitrile-butadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chlorosulfonated polyethylene rubber, acrylic rubber, epichlorohydrin rubber, polysulfide rubber, silicone rubber, fluororubber, and urethane rubber. These examples may be used alone or in combination of two or more.

The rubber composition may be mixed with a reinforcing filler as necessary. Examples of the reinforcing filler include carbon black and inorganic fillers, and the reinforcing filler is preferably at least one selected from the carbon black and inorganic fillers.

Inorganic Filler

The inorganic filler is not particularly limited, and may be selected as appropriate depending on the application thereof. Examples thereof include silica, aluminum hydroxide, clay, alumina, talc, mica, kaolin, glass balloon, glass beads, calcium carbonate, magnesium carbonate, magnesium hydroxide, calcium carbonate, magnesium oxide, titanium oxide, potassium titanate, and barium sulfate. These examples may be used alone or in combination of two or more.
In using an inorganic filler, a silane coupling agent may also be used as appropriate.

The content of the reinforcing filler is not particularly limited, and may be selected as appropriate depending on the application thereof. The preferred content thereof is 5 parts by mass to 200 parts by mass per 100 parts by mass of the rubber component.
If the content of the reinforcing filler is less than 5 parts by mass, there may not be much effect attained by adding the reinforcing filler. Alternatively, if the content is more than 200 parts by mass, mixture of the reinforcing filler into the rubber component tends to fail and the resulting rubber composition may have lower performance.

Crosslinking Agent

The crosslinking agent is not particularly limited, and may be selected as appropriate depending on the application thereof. Examples thereof include a sulfur-based crosslinking agent, an organic peroxide-based crosslinking agent, an inorganic crosslinking agent, a polyamine cros slinking agent, a resin crosslinking agent, a sulfur compound-based crosslinking agent, oxime-nitrosamine-based crosslinking agent, and sulfur. Among these, preferred for a rubber composition for tires is the sulfur-based crosslinking agent.

The content of the crosslinking agent is not particularly limited, and may be selected as appropriate depending on the application thereof. The preferred content thereof is 0.1 parts by mass to 20 parts by mass per 100 parts by mass of the rubber component.
The crosslinking agent added by less than 0.1 parts by mass in content may hardly develop crosslinking, whereas the content exceeding 20 parts by mass tends to develop crosslinking by part of the cros slinking agent during the mixing, or to impair the physical property of the vulcanizate.

Other Components

Other than the above, a vulcanization accelerator may also be contained. Examples of compounds that can be used as the vulcanization accelerator include: guanidine-based compounds, aldehyde-amine-based compounds, aldehyde-ammonia-based compounds, thiazole-based compounds, sulfenamide-based compounds, thiourea-based compounds, thiuram-based compounds, dethiocarbamate-based compounds, and xanthate-based compounds.
Further, if necessary, any known agent such as a reinforcing agent, a softening agent, a filler, a co-agent, a colorant, a flame retardant, a lubricant, a foaming agent, a plasticizer, a processing aid, an antioxidant, an age resister, an anti-scorch agent, an ultraviolet rays protecting agent, an antistatic agent, a color protecting agent, and other compounding agents may be used depending on the intended use thereof.

Crosslinked Rubber Composition

The crosslinked rubber composition according to the present invention is not particularly limited as long as being obtained by crosslinking the rubber composition of the present invention, and may be selected as appropriate depending on the application thereof.
The conditions of the crosslinking are not particularly limited, and may be selected as appropriate depending on the application thereof. Conditions of temperature and heating time for the crosslinking may preferably be in the range of 120° C. to 200° C. for 1 minute to 900 minutes.

Tire

A tire of the present invention is not particularly limited as long as being manufactured by using the rubber composition of the present invention or the crosslinked rubber composition of the present invention, and may be selected as appropriate depending on the application thereof.
The rubber composition of the present invention or the crosslinked rubber composition of the present invention may be applied, for example, to a tread, a base tread, a sidewall, a side reinforcing rubber, and a bead filler of a tire, without being limited thereto.

The tire can be manufactured by a conventional method. For example, a carcass layer, a belt layer, a tread layer, which are composed of unvulcanized rubber, and other members used for the production of usual tires are successively laminated on a tire molding drum, then the drum is withdrawn to obtain a green tire. Thereafter, the green tire is heated and vulcanized in accordance with an ordinary method, to thereby obtain a desired tire.

Applications Other Than Tires

The rubber composition of the present invention or the crosslinked rubber composition of the present invention may be used for other applications than tires, such as anti-vibration rubber, seismic isolation rubber, a belt (conveyor belt), a rubber crawler, various types of hoses, and moran.

EXAMPLES

In the following, the present invention will be described with reference to examples thereof. However, the present invention is no way limited to the disclosed examples.

Example 1

A toluene solution of 700 mL containing 28.0 g (0.52 mol) of 1,3-butadiene was added to a 2 L stainless reactor that had been sufficiently dried, and then ethylene was introduced thereto at 0.8 MPa. Meanwhile, in a glovebox under a nitrogen atmosphere, 400.0 µmol of dimethylaluminum(µ-dimethyl)bis(2-phenylindenyl)neodymium [(2-PhC$_9$H$_6$)$_2$Nd(µ-Me)$_2$AlMe$_2$] and 200.0 µmol of triphenylcarbonium tetrakis (pentafluorophenyl)borate [Ph$_3$CB(C$_6$F$_5$)$_4$] were provided in a glass container, and dissolved into 80 mL of toluene, to thereby obtain a catalyst solution. After that, the catalyst solution was taken out from the glovebox and added by 390.0 µmol of neodymium equivalent to the monomer solution, which was then subjected to polymerization at room temperature for 90 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain Copolymer A (a random copolymer). The yield of Copolymer A thus obtained was 16.00 g.

Example 2

An experiment was performed similarly to Example 1 except that polymerization temperature was 60° C. and polymerization time was 60 minutes, to thereby obtain Copolymer B (a random copolymer). The yield of Copolymer B thus obtained was 17.00 g.

Example 3

An experiment was performed similarly to Example 2 except that ethylene was first introduced at a pressure of 1.5 MPa, to thereby obtain Copolymer C (a random copolymer). The yield of Copolymer C thus obtained was 19.50 g.

Comparative Example 1

Butadiene rubber (BR01, manufactured by JSR) was prepared as a sample of a comparative example.

Comparative Example 2

Polymerization was performed in a similar manner to that of an example disclosed in JP 2006-249442 A (filed by Mitsui Chemicals; see spec para [0554]) to obtain Copolymer D (a random copolymer).

Random Copolymers A to C of Examples 1 to 3, butadiene rubber of Comparative Example 1, and Copolymer D of Comparative Example 2 thus produced or obtained were each subjected to measurement and evaluation by the following method so as to investigate the content of a conjugated diene-derived unit, the weight-average molecular weight (Mw), the molecular weight distribution (Mw/Mn), the DSC curve, the content of alternate bonding components (mol %), and the 1,2-vinyl bond content (%).

(1) Content of Conjugated Diene-Derived Unit

The content of the diene-derived unit in the copolymer (mol %) was determined from an integral ratio of an ethylene bond component (28.5 ppm to 30.0 ppm) of the whole to a butadiene bond component (26.5 ppm to 27.5 ppm+31.5 ppm to 32.5 ppm) of the whole, based on $^{13}$C-NMR spectrum (100° C., d-tetrachloroethane standard: 73.8 ppm). The content (mol %) of the conjugated diene-derived unit is shown in Table 1.

(2) Weight-Average Molecular Weight (Mw) And Molecular Weight Distribution (Mw/Mn)

A polystyrene equivalent weight-average molecular weight (Mw) and a molecular weight distribution (Mw/Mn) of each copolymer were obtained through gel permeation chromatography [GPC: HLC-8121GPC/HT (manufactured by Tosoh Corporation), column: two of GMH$_{HR}$-H(S)HT (manufactured by Tosoh Corporation), detector: differential refractometer (RI)], using monodisperse polystyrene as a reference. The measurement temperature was 140° C.

(3) DSC Curve

A DSC curve of each copolymer was obtained by differential scanning calorimetry (DSC) according to JIS K7121-1987.

(4) Content of Alternate Bonding Components (Alternate Bonding Units)

The content of alternate bonding components (alternate bonding units) in the ethylene-derived unit in the copolymer (mol %) was determined from an integral ratio of a peak area of the entire ethylene-derived units (28.5 ppm to 30.0 ppm) to an area corresponding to alternate bonding units of ethylene (precisely, a peak area originated from carbons next to alternate bonding units of ethylene: 26.9 to 27.0 ppm+31.8 to 32.1 ppm), based on $^{13}$C-NMR spectrum. The content of alternate bonding components (alternate bonding units) in ethylene-derived units (mol %) is shown in Table 1.

(5) 1,2-Vinyl Bond Content

The 1,2-vinyl bond content of the butadiene unit in the copolymer is determined from an integral ratio of 1,2-vinyl bond component (5.0 ppm to 5.1 ppm) to a butadiene bond component (5 ppm to 5.6 ppm) of the whole, based on $^1$H-NMR spectrum (100° C., d-tetrachloroethane standard: 6 ppm).

TABLE 1

|  | Example 1 | Example 2 | Example 3 | Comparative Example 1 | Comparative Example 2 |
|---|---|---|---|---|---|
| Copolymer Type | A | B | C | Butadiene Rubber | D |
| Mw (×10³) | 166 | 144 | 124 | 190 | 163 |
| Mw/Mn | 1.58 | 1.68 | 1.96 | 2.27 | 2.05 |
| Content of Conjugated Diene-derived Unit (mol %) | 93 | 90 | 81 | 100 | 7 |
| Alternate Bonding Components (mol %) | 16 | 53 | 13 | 53 | 3 |
| 1,2-vinyl Bond Content (%) | 0.9 | 2.6 | 0.8 | 1.8 | 0.2 |

Further, the sequence distribution of Copolymer A was analyzed by applying ozonolysis-GPC measurements disclosed in a document (*Polymer preprints*, Japan, Vol. 42, No. 4, pp. 1347). A polystyrene equivalent weight-average molecular weight (MW) and molecular weight distribution (Mw/Mn) of each copolymer were obtained through gel permeation chromatography [GPC: HLC-8121GPC/HT (manufactured by Tosoh Corporation), column: two of GPC HT-803 (manufactured by Showa Denko K.K.), detector: differential refractometer (RI)], using monodisperse polystyrene as a reference, at measurement temperature of 140° C.]. The result showed that the total ethylene component contains 10 mass % or less of a block ethylene component, that is, polyethylene component having a number-average molecular weight (Mn) of 1,000 or more, that is, Copolymer A was high in randomness.

It was further found from the DSC curve of Copolymer A in FIG. 1 that Copolymer A was a random copolymer since there is no melting point peak at 120° C. or higher resulting from a polyethylene block.

Further, it was similarly confirmed that Copolymers B and C were random copolymers having randomly arranged monomer units of 1,3-butadiene and of ethylene, and that Copolymer D involves random arrangement of butadiene in polyethylene based on the peak position of butadiene bond component (26.5 to 27.5 ppm and 31.5 to 32.5 ppm) in the $^{13}$C-NMR spectrum.

As Examples 1 to 3 and Comparative Examples 1 and 2, the rubber compositions formulated as shown in Table 2 were prepared, evaluated for their rollability according to the following method and were vulcanized at 160° C. for 20 minutes, and the vulcanized rubber compositions thus obtained were then subjected to measurements of wear resistance (index) according to the following method.

TABLE 2

|  | parts by mass |
|---|---|
| polymer | 100 |
| stearic acid | 2 |
| carbon black (HAF class) | 50 |
| age resistor *1 | 1 |
| zinc oxide | 3 |
| co-agent CZ-G *2 | 0.4 |
| co-agent DM-P *3 | 0.2 |
| sulfur | 1.5 |

*1: N-(1,3-dimethylbutyl)-N'-p-phenylenediamine (NOCRAC 6C), manufactured by OUCHI SHINKO CHEMICAL INDUSTRIAL CO., LTD.
*2: N-cyclohexyl-2-benzothiazolesulfenamide (NOCCELER CZ-G), manufactured by OUCHI SHINKO CHEMICAL INDUSTRIAL CO., LTD.
*3: dibenzothiazyl disulfide (NOCCELER DM-P), manufactured by OUCHI SHINKO CHEMICAL INDUSTRIAL CO., LTD.

Rollability

Unvulcanized rubber formulations were wound around an 8-inch open roll at 60° C., and the respective winding states were visually observed to evaluate their rollability, the results of which were classified into the following three ratings:
++ Adhered to the roll upon entry; showing good rollability.
+ Wound around the roll upon entry; workable.
- Non-adhesive, failed to be wound around the roll; unrollable (powder, granular)

Wear Resistance (Index)

According to JIS K 6264-2:2005, the amount of abrasion was measured using a Lambourn abrasion tester with a slip rate of 60% at room temperature, and the results are shown as being indexed with a score of 100 representing the inverse of each result of Comparative Example 1. Larger index values represent less abrasion and better wear resistance.

TABLE 3

|  | Example 1 | Example 2 | Example 3 | Comparative Example 1 | Comparative Example 2 |
|---|---|---|---|---|---|
| Copolymer Type | A | B | C | Butadiene Rubber | D |
| Mw (×10³) | 166 | 144 | 124 | 190 | 163 |
| Mw/Mn | 1.58 | 1.68 | 1.96 | 2.27 | 2.05 |
| Content of Conjugated Diene-derived Unit (mol %) | 93 | 90 | 81 | 100 | 7 |
| Alternate Bonding Components (mol %) | 16 | 53 | 13 | 53 | 3 |
| Vinyl Bond Content (%) | 0.9 | 2.6 | 0.8 | 1.8 | 0.2 |

TABLE 3-continued

|  | Example 1 | Example 2 | Example 3 | Comparative Example 1 | Comparative Example 2 |
| --- | --- | --- | --- | --- | --- |
| Rollability | ++ | ++ | ++ | + | − |
| Wear Resistance (index) | 104 | 108 | 107 | 100 | 61 |

It can be seen from Table 3 that each copolymer, which contains a unit derived from a conjugated diene compound by more than 30 mol %, has better rollability and wear resistance.

INDUSTRIAL APPLICABILITY

The copolymer of the present invention can be used generally for elastomer products, in particular, tire members.

The invention claimed is:

1. A copolymer of a conjugated diene compound and a non-conjugated olefin, comprising a random copolymer having randomly arranged monomer units of the conjugated diene compound and of the non-conjugated olefin, and containing, by 81 mol % to 97 mol %, a unit derived from the conjugated diene compound,
wherein the copolymer contains, by at least 5 mol %, alternate bonding units of the conjugated diene compound and the non-conjugated olefin in a unit derived from the non-conjugated olefin.

2. The copolymer according to claim 1, wherein the content of 1,2 adduct units (including 3,4 adduct units) of the conjugated diene compound in the unit derived from the conjugated diene compound is 5% or less.

3. The copolymer according to claim 1, comprising a copolymer having a polystyrene-equivalent average-weight molecular weight of 10,000 to 10,000,000.

4. The copolymer according to claim 1, comprising a copolymer having a molecular weight distribution (Mw/Mn) of 10 or less.

5. The copolymer according to claim 1, wherein the non-conjugated olefin is an acyclic olefin.

6. The copolymer according to claim 1, wherein the non-conjugated olefin has 2 to 10 carbon atoms.

7. The copolymer according to claim 5, wherein the non-conjugated olefin is at least one selected from the group consisting of ethylene, propylene, and 1-butene.

8. The copolymer according to claim 7, wherein the non-conjugated olefin is ethylene.

9. The copolymer according to claim 1, wherein the conjugated diene compound is at least one selected from the group consisting of 1,3-butadiene and isoprene.

10. A rubber composition comprising the copolymer according to claim 1.

11. The rubber composition according to claim 10, comprising, with respect to 100 parts by mass of the rubber component, a reinforcing filler by 5 parts by mass to 200 parts by mass and a crosslinking agent by 0.1 parts by mass to 20 parts by mass.

12. A crosslinked rubber composition obtained by crosslinking the rubber composition according to claim 10.

13. A tire manufactured by using the rubber composition according to claim 10.

* * * * *